Jan. 21, 1930.　　　L. H. HANSEN　　　1,744,546
CONDENSER COUPLING DEVICE
Filed March 18, 1929　　　3 Sheets-Sheet 1

Inventor:
Leland H. Hansen,

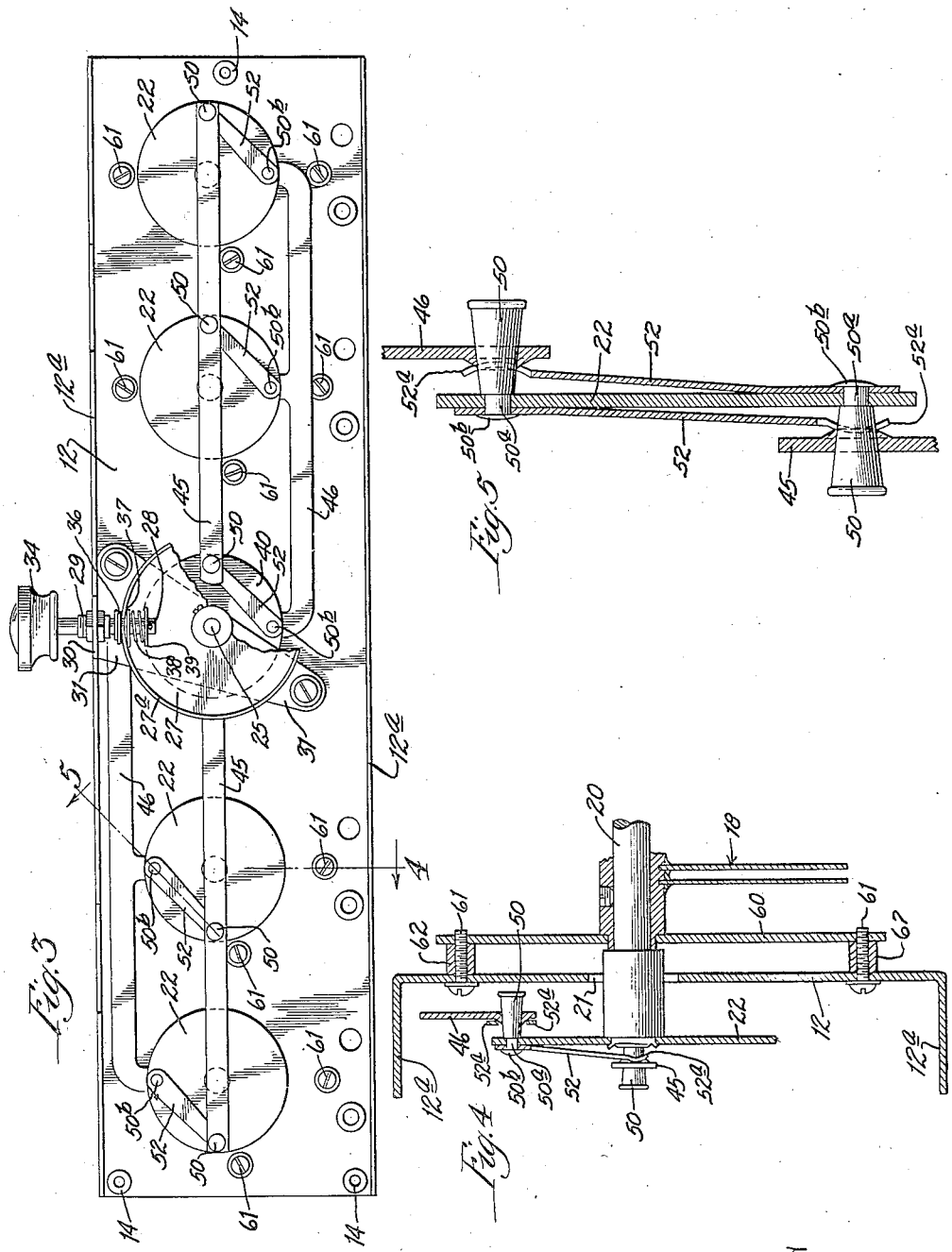

Jan. 21, 1930.  L. H. HANSEN  1,744,546
CONDENSER COUPLING DEVICE
Filed March 18, 1929  3 Sheets-Sheet 3

Inventor:
Leland H. Hansen,
By Dyrenforth, Lee, Chritton & Wiles,
Attys.

Patented Jan. 21, 1930

1,744,546

UNITED STATES PATENT OFFICE

LELAND H. HANSEN, OF CHICAGO, ILLINOIS, ASSIGNOR TO HOWARD RADIO CO., OF CHICAGO, ILLINOIS, A CORPORATION OF ILLINOIS

CONDENSER COUPLING DEVICE

Application filed March 18, 1929. Serial No. 347,918.

This invention relates to improvements in condenser mountings and, more especially, to such apparatus designed for use in connection with radio receiving sets.

One of the features of my invention is the provision of means in apparatus of this type by which a plurality or gang of condensers can be mounted in alignment on a base and not be moved out of position in the event the base is warped or twisted. This features is of special importance in connection with radio receiving sets because gang condensers in apparatus of this kind, after being once mounted, should not be disturbed. By the use of my invention, a gang of condensers may be accurately mounted and will not be materially moved out of position or alignment even though the entire apparatus is exposed to considerable stress and strain during shipment, or otherwise.

Another feature of my invention is the provision of means for driving or rotating a gang of condensers from a single shaft or operating knob, said means giving a smooth even continuous drive to all the condensers simultaneously without any undue stresses or strains.

Other features of my invention will appear more fully as I proceed with my specification.

In that form of device embodying the features of my invention as shown in the accompanying drawings—

Figure 1:
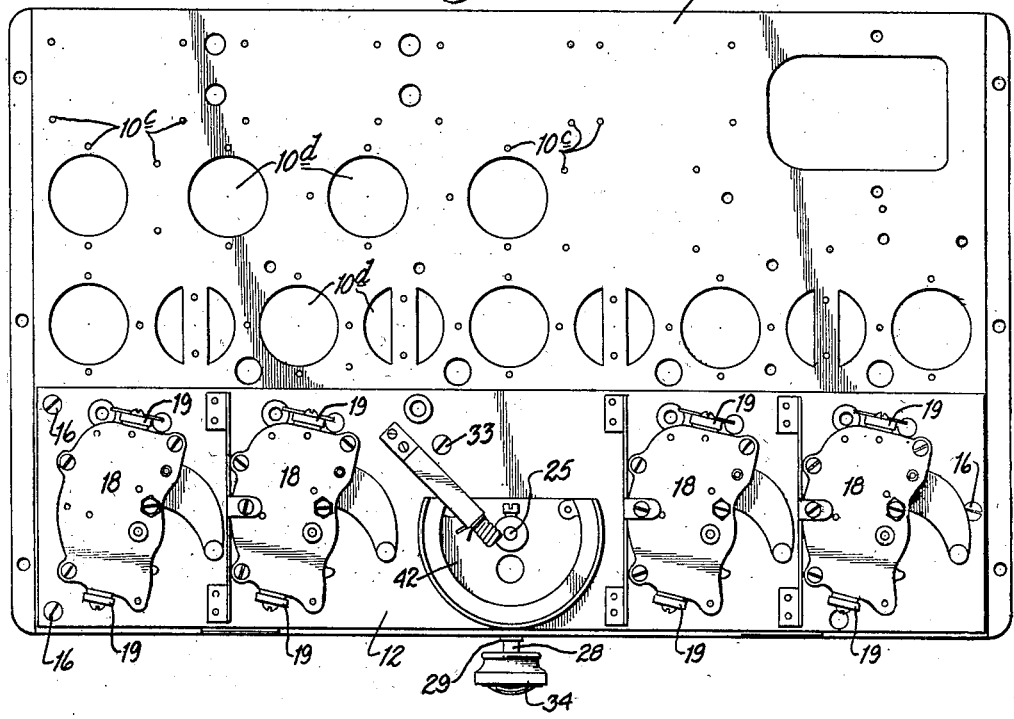
Figure 2:
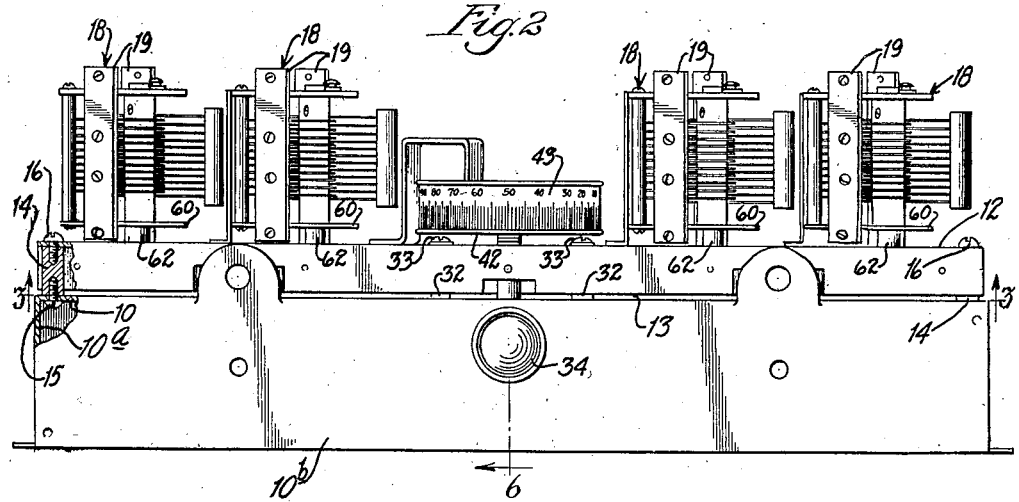
Figure 6:
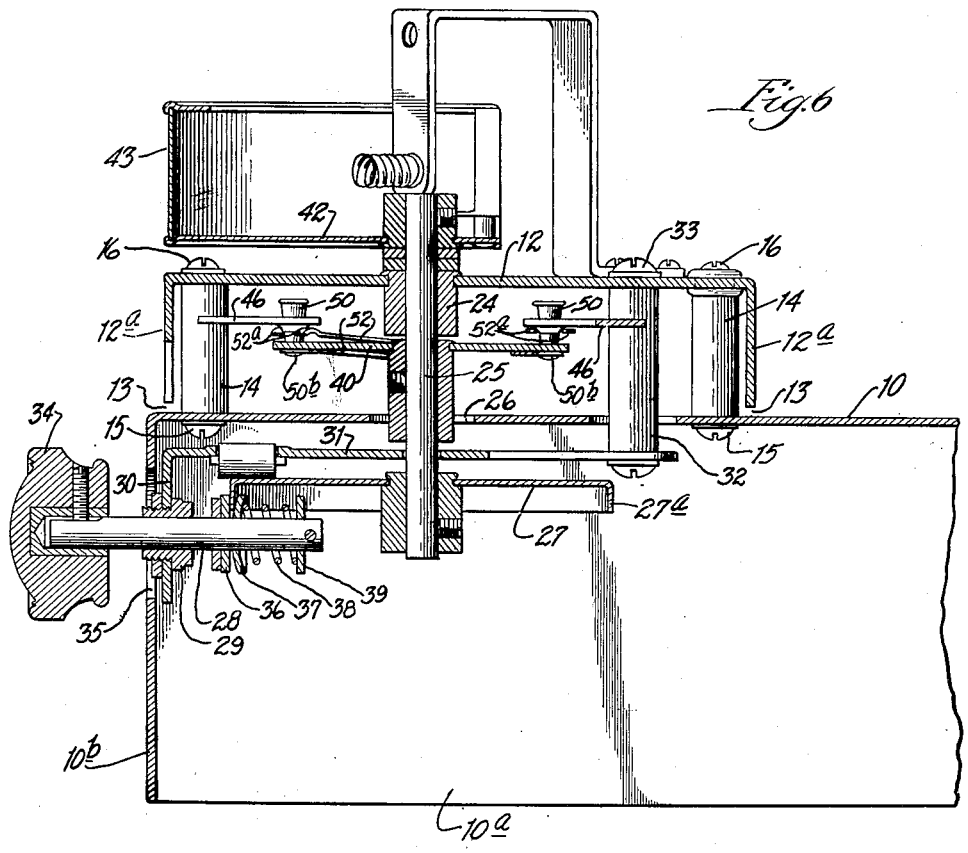

Figure 1 is a plan view; Fig. 2 is a view in front elevation; Fig. 3 is a view taken as indicated by the line 3 of Fig. 2; Fig. 4 is a view taken as indicated by the line 4 of Fig. 3; Fig. 5 is a view taken as indicated by the line 5 of Fig. 3; and Fig. 6 is a view taken as indicated by the line 6 of Fig. 2.

As shown in the drawings, 10 indicates a raised rectangular sheet metal base with the side edges 10$^a$ and front edge 10$^b$ bent downwardly to form supporting flanges. The rear of the base plate 10 is suitably drilled with holes 10$^c$, 10$^d$, and the like, to assist in mounting thereon the necessary transformers, tube sockets, and other parts of a radio receiving set.

Upon the plate 10, adjacent its forward edge, there is mounted an elongated condenser-supporting plate 12. This plate likewise is made preferably of sheet metal and also preferably has its marginal edges bent downwardly, as indicated by 12$^a$, in order to add stiffness thereto. The condenser-supporting plate 12 is spaced a short distance from the base 10, as indicated by 13, and carried by three posts, one centrally spaced at one end and the other two at the corners at the opposite end. These posts 14, which also act as spacing members, are attached to the base 10 by means of the screws 15, and the screw 16 serves to attach said post to the underside of the condenser-supporting plate 12.

Numeral 18 indicates a plurality (here shown as four) of condensers mounted in alignment on the supporting plate 12, said condensers constituting a so-called gang of condensers. These condensers 18 may be mounted on the supporting plate 12 in any suitable manner, as, for example, by means of the upwardly projecting posts 19, 19. Since the details of the condensers themselves form no part of the present invention, they need not be described particularly here. It will suffice to say that each of the condensers 18 is provided with the usual operating shaft 20 extending downwardly through an enlarged hole 21 in the plate 12.

The lower end of each condenser shaft 20 carries a driven crank disk 22 lying above the base 10 and below the condenser-supporting plate 12.

Rotatably mounted in a central bearing 24 carried by the condenser-supporting plate 12, with two condensers on each side thereof, is a rotatable driving shaft 25 extending downwardly through an enlarged hole 26 in the base 10. The lower end of this shaft carries a driving disk 27 adapted to be operated by friction disks on the operating shaft 28. The shaft 28 is mounted in a bearing 29 carried by the depending end 30 of a cross member 31 supported, in turn, from the lower end of a stud 32 having its upper end attached to the plate 12 by means of the screw 33. Numeral 34 indicates the usual hand knob on the shaft 28 for rotating the same, it being understood that said shaft 28 projects forwardly through an enlarged opening 35 in the forward edge 10ᵇ of the base 10. The periphery of the disk 27 is bent downwardly, as indicated by 27ᵃ, to form an annular flange, and the shaft 28 carries the two driving disks 36 and 37 with the flange 27ᵃ lying therebetween, the disk 36 being stationary and the disk 37 being pressed against the flange by means of the spring 38, the inner end of which is held by means of the collar 39.

The shaft 25 carries a driving crank disk 40 in alignment with the driven crank disks 22 carried by the condenser shafts 20.

The upper end of the driving shaft 25 carries a disk 42 having at its periphery the usual dial 43.

I shall now describe in detail the means for transmitting motion from the driving disk 40 to the driven disks 22. Since this is the same in each case, I need describe but one connection in detail. The disks 22 of the two condensers on each side are joined to the driving disk 40 by means of two parallel connecting rods, indicated by 45 and 46. The connecting rods are attached to the peripheries of the disks at points spaced substantially 90° apart. By means of this construction, it will be noted that as one connecting rod approaches the dead center, the other connecting rod will lie at substantially its best driving angle, thus lessening or eliminating any undue stresses and strains in connection with the driving movement.

The connecting rods 45 and 46 on each side of the apparatus lie on opposite sides of the disks. The connecting rods are attached to the disks by means of tapered crank pins, as shown more in detail in Figs. 4, 5 and 6. In Fig. 5 is shown one of the driven disks 22 having attached thereto the connecting rods 45 and 46. The tapered crank pins referred to are indicated by 50. The inner end of the crank pin 50, that is, the end adjacent the disk 22, is the smaller and said end is preferably reduced in diameter still more, as indicated by 50ᵃ, said reduced end extending through the disk 22 and being riveted, as indicated by 50ᵇ. The extreme inner end of the pin 50 carries one end of a flat spring 52, the other end of said spring lying under the connecting rod 45, as indicated by 52ᵃ, said end 52ᵃ of the spring serving to press outwardly the connecting rod 45 towards the large end of the crank pin 50 on which it is mounted, thus serving to take up lost motion. There being two crank pins 50 on each disk, it is to be understood that the inner end of each crank pin carries such a spring 52 serving to press against the connecting rod on the other crank pin. Each of the connecting rods, where it is attached to the crank pin, is provided with a hole through which such crank pin extends.

The condenser shafts 20 are rotatably mounted in plates 60 mounted on the supporting plate 12 by means of the screws 61, numeral 62 indicating spacing sleeves carried by said screws.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

What I regard as new, and desire to secure by Letters Patent, is:

Means for rotating a plurality of condenser shafts in alignment including; a driving crank disk; a driven crank disk on each condenser shaft; two parallel connecting rods with holes therein on opposite sides of said disks connected to the peripheries thereof, said connections being spaced substantially 90° apart on said peripheries; tapered crank pins carried by said disks and extending through the holes in the connecting rods, the inner end of each crank pin extending through the disk and carrying one end of a flat spring, the other end of said spring lying under the connecting rod on the other pin and serving to press it outwardly toward the large end of said pin.

In testimony whereof, I have hereunto set my hand this 14th day of March, 1929.

LELAND H. HANSEN.